(12) United States Patent
Murotani

(10) Patent No.: US 7,565,578 B2
(45) Date of Patent: Jul. 21, 2009

(54) OPTICAL DISC APPARATUS, AND METHOD FOR SELF-DIAGNOSIS CONTROL OF OPTICAL DISC APPARATUS

(75) Inventor: Shigeru Murotani, Kawasaki (JP)

(73) Assignee: Hitachi-LG Data Storage, Inc., Tokyo (JP)

(*) Notice: Subject to any disclaimer, the term of this patent is extended or adjusted under 35 U.S.C. 154(b) by 135 days.

(21) Appl. No.: 11/849,472

(22) Filed: Sep. 4, 2007

(65) Prior Publication Data
US 2008/0192592 A1    Aug. 14, 2008

(30) Foreign Application Priority Data
Feb. 9, 2007 (JP) ............... 2007-030469

(51) Int. Cl.
G06F 13/28 (2006.01)
G06F 11/00 (2006.01)

(52) U.S. Cl. .................... 714/30; 714/733; 714/738

(58) Field of Classification Search ............. 714/25–31, 714/726–742
See application file for complete search history.

(56) References Cited

U.S. PATENT DOCUMENTS

| | | | |
|---|---|---|---|
| 4,769,804 A * | 9/1988 | Satoh et al. | 369/53.16 |
| 4,969,139 A * | 11/1990 | Azumatani et al. | 369/53.16 |
| 5,522,035 A * | 5/1996 | Yamanishi | 714/30 |
| 5,748,589 A * | 5/1998 | Shimizu | 369/53.2 |
| 6,612,989 B1 * | 9/2003 | Brock-Fisher | 600/447 |
| 7,039,746 B2 * | 5/2006 | Takahashi et al. | 710/306 |
| 2005/0154950 A1 | 7/2005 | Budiman et al. | |

FOREIGN PATENT DOCUMENTS

| | | |
|---|---|---|
| JP | 03-209601 | 9/1991 |
| KR | 2001-0077277 | 8/2001 |

* cited by examiner

Primary Examiner—Christopher B Shin
(74) Attorney, Agent, or Firm—Antonelli, Terry, Stout & Kraus, LLP.

(57) ABSTRACT

An optical disc apparatus capable of performing self-diagnosis receives from a host computer a command to enable a self-diagnostic mode. Information indicating that the self-diagnosis mode is specified is written to a ROM in the optical disc apparatus. Product inspection is performed while the optical disc apparatus is not connected to the host PC. The optical disc apparatus checks whether the information has been written to the ROM. When the information is written to the ROM, the optical disc apparatus performs self-diagnosis mode inspection. When the optical disc apparatus is connected to the host PC to allow for the establishment of communications by use of an out-of-band signal, the information written to the ROM is erased on the assumption that the connection has been established. This eliminates an unnecessary command and prevents a malfunction caused by the self-diagnostic mode in a destination site.

8 Claims, 3 Drawing Sheets

OPTICAL DISC APPARATUS, AND METHOD FOR SELF-DIAGNOSIS CONTROL OF OPTICAL DISC APPARATUS

CLAIMS OF PRIORITY

The present application claims priority from Japanese application serial no. 2007-030469, filed on Feb. 9, 2007, the content of which is hereby incorporated by reference into this application.

BACKGROUND OF THE INVENTION

The present invention relates to an optical disc apparatus and a method for self-diagnosis control of an optical disc apparatus. More particularly, the present invention relates to an optical disc apparatus that is connected to a host computer through an SATA interface, and that is suitable for the control relating to a self-diagnostic mode at the time of the shipment of the optical disc apparatus from a factory, and relates to a method for self-diagnosis control of the optical disc apparatus.

The ATA specifications are mainstream specifications used for an interface between a computer and a peripheral device such as a hard disk drive and an optical disc apparatus (DVD-ROM device). As an interface that replaces the ATA (AT Attachment) specifications, the SATA (Serial ATA) interface is attracting a lot of attention.

The SATA interface is made by changing the parallel transmission method used in the current ATA specifications, such as Ultra ATA, to the serial transmission method. As a result, with the compatibility with several kinds of conventional ATA standards adopting the parallel method being kept unchanged, the SATA specifications allow for a high-speed transfer rate through a simple cable. Heretofore, for example, settings of selectable pins are required on a drive basis. However, such settings are also not required in the SATA specifications. If a hard disk drive, or the like, is connected, it can be used quickly.

Incidentally, one of the product inspection items carried out in a manufacturing site is that an optical disc apparatus is operated for a long time so as to compare the performance of the optical disc apparatus before the operation with that after the operation.

The long-time operation of the optical disc apparatus is performed in a self-diagnostic mode that is built into the optical disc apparatus beforehand. The optical disc apparatus is configured to operate in this self-diagnosis mode only by the power supply without being connected to a host PC.

Japanese Patent Laid-open No. Hei.3-209601 discloses a disk drive including a self-diagnosis function that enables each section to independently operate without being connected to a host computer.

The conventional optical disc apparatuses, which use the ATA connection based on the parallel transmission method, specify the self-diagnosis mode by use of a selectable pin for specifying master/slave connection. The optical disc apparatus checks a connection state of the selectable pin when the power supply thereof is turned ON. If it is judged that the self-diagnosis mode is specified, the optical disc apparatus executes the self-diagnosis operation.

SUMMARY OF THE INVENTION

In the case of the ATA specifications based on the parallel transmission method, the self-diagnosis mode can be specified by use of the selectable pin as described above. However, in the case of the optical disc apparatuses based on the SATA connection, there is no master/slave connection specification. Therefore, it is not possible to achieve the specification by use of the selectable pin used for specifying master/slave connection.

For this reason, if the SATA connection is used, it is thought that a function of specifying a self-diagnosis mode according to a command received from a host PC is used to specify the self-diagnosis mode.

In this case, the optical disc apparatus is required to execute the self-diagnosis mode only by the power supply without being connected to the host PC. Therefore, after the optical disc apparatus is connected to the host PC to specify the self-diagnosis mode by use of a command, it is necessary to store the specification of the self-diagnosis mode in a rewritable ROM such as a Flash ROM and an EEPROM so that the specification is kept stored even if the power supply is turned OFF.

Under such settings, when the power supply is turned ON, the optical disc apparatus checks whether or not the self-diagnosis mode is specified on the rewritable ROM. If it is judged that the self-diagnosis mode is specified, the optical disc apparatus executes the self-diagnosis operation. Then, after inspection, it is necessary to disable the self-diagnosis mode before the optical disc apparatus is shipped.

Methods which can be considered as a disabling method for disabling a self-diagnosis mode include a method in which a self-diagnosis mode disabling command is prepared beforehand, and then the self-diagnosis mode specification on the rewritable ROM is erased by the self-diagnosis mode disabling command.

In addition, there is also considered a method in which at a point of time at which an ATAPI command is received, the self-diagnosis mode specification on the rewritable ROM is erased to disable the self-diagnosis mode so that even if an optical disc apparatus is shipped without disabling the self-diagnosis mode thereof, the self-diagnosis mode is disabled when the optical disc apparatus is connected to the host PC in the destination site.

However, both of the methods require the host PC to issue a command to disable the self-diagnosis mode.

Moreover, the disk drive disclosed in Japanese Patent Laid-open No. Hei.3-209601 is so devised that a judgment is made by a parameter, which is set in a specified area of the disk drive, as to whether the optical disc apparatus operates in a normal mode in which data is normally recorded or reproduced or in a burn mode in which burn-in is performed. Because of it, in order to switch the disk drive from the burn mode to the normal mode, it is necessary to rewrite the parameter. However, how to set the parameter again is not disclosed.

The present invention is devised to solve the above-mentioned problems. An object of the present invention is to eliminate an unnecessary command transmission/reception interface with the host PC, such as a self-diagnosis mode disabling command, in an optical disc apparatus capable of performing self-diagnosis, and thereby to reduce the labor of product development.

Moreover, another object of the present invention is to provide an optical disc apparatus that is capable of automatically disabling a self-diagnostic mode thereof in a destination site even if the optical disc apparatus is shipped with the self-diagnostic mode being kept specified, and that is thereby capable of preventing a malfunction of the optical disc apparatus.

When the connection between an optical disc apparatus according to the present invention and a host PC is established through an SATA interface, the optical disc apparatus erases the specification of a self-diagnosis mode written to a ROM to disable the self-diagnosis mode.

It is assumed that when an out-of-band (OOB) signal is transmitted/received between the host PC and the optical disc apparatus so that communications are established, which is one of the characteristics of the SATA interface, the connection between the host PC and the optical disc apparatus is established.

DESCRIPTION OF THE PREFERRED EMBODIMENT

An embodiment according to the present invention will be described with reference to FIG. 1 or 4 as below.

First, the configuration of an optical disk system according to the embodiment will be described with reference to FIG. 1.

Figure 1:
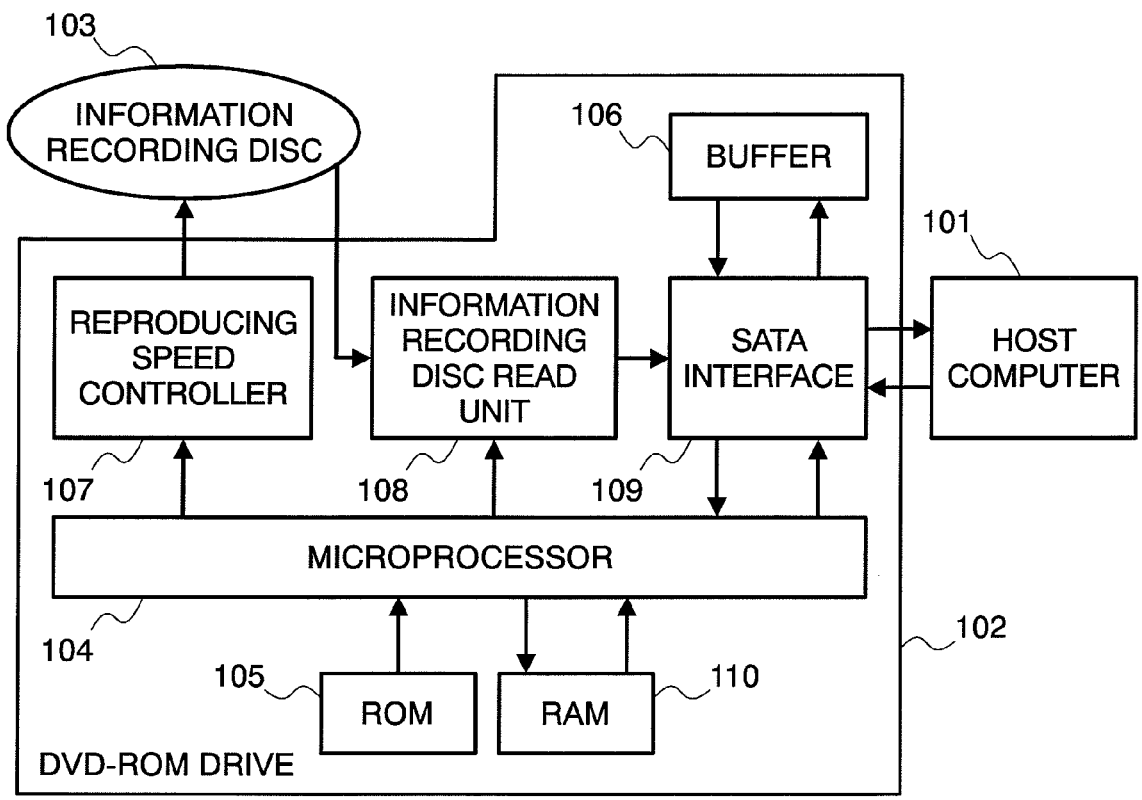
FIG. 1 is a diagram illustrating the configuration of an optical disk system according to an embodiment of the present invention.

Referring to FIG. 1, an optical disc apparatus 102 is connected to a host computer 101 through an SATA cable so that a command and data can be communicated between the optical disc apparatus 102 and the host computer 101. As shown in FIG. 1, a DVD-ROM drive is taken as an example of the optical disc apparatus 102. However, any kind of optical disc apparatus can be used as the optical disc apparatus 102 so long as the optical disc apparatus in question can communicate with the host computer 101 through an STA interface. For example, optical disc apparatuses such as a DVD-RW drive and a DVD-RAM drive, each of which is capable of mounting a rewritable medium, may also be used. In the case of the DVD-ROM drive, a read-only medium is used. The DVD-ROM drive is equipped with an information recording disc 103. Data which has been read out is transmitted to the host computer 101.

The optical disc apparatus 102 includes a microprocessor 104, are producing speed controller 107, an information recording disc read unit 108, a SATA interface 109, a buffer 106, a ROM 105, and a RAM 110.

The microprocessor (control unit) 104 reads out required information from the ROM 105 and the RAM 110, and then gives a required control instruction to the reproducing speed controller 107, the information recording disc read unit 108, and the SATA interface 109.

The reproducing speed controller 107 controls the reproduction speed at which the information recording disc 103 is reproduced. The information recording disc read unit reads out data from the information recording disc 103, and then transmits the data to the SATA interface 109. The buffer 106 is a storage area in which data is temporarily stored.

Next, how to set a self-diagnosis mode of the optical disc apparatus 102 will be described.

As described above, one of the product inspection items to be carried out in a manufacturing site is that an optical disc apparatus is operated for a long time so as to compare the performance of the optical disc apparatus before the operation with that after the operation. In this case, the long-time operation of the optical disc apparatus is performed in a self-diagnostic mode that is built into the optical disc apparatus beforehand. The optical disc apparatus is configured to operate in this self-diagnosis mode only by the power supply without being connected to the host computer 101. In the self-diagnosis mode, a tray of the optical disc apparatus is slid out; and then an inspector places an inspection disc on the tray as the information recording disc 103. After that, the tray is slid into the optical disc apparatus. The optical disc apparatus then makes a random access to the inspection disc to check the optical disc apparatus for a long time (for example, a check is made as to whether or not a failure of the optical disc apparatus has occurred). In order to achieve such operation, a self-diagnosis program stored in the ROM 105 is executed by the microprocessor 104.

The self-diagnosis mode is specified by transmitting a self-diagnosis mode specification command from the host computer 101.

After the optical disc apparatus 102 is connected to the host computer 101, if the optical disc apparatus receives the self-diagnosis mode specification command from the host computer 101, the optical disc apparatus stores the specification of the self-diagnosis mode in the ROM 110 so that the specification is kept stored even if the power supply is turned OFF. As a result, the optical disc apparatus 102 can execute the self-diagnosis mode operation only by the power supply without being connected to the host computer 101. Here, the ROM 110 is are writable ROM such as a Flash ROM and an EEPROM. In addition, any nonvolatile memory in which stored data is not lost even if the power supply is turned OFF can be used as a memory to which the self-diagnosis mode is written. Other kinds of memories such as a flash memory may also be used.

Next, processing of selecting between the self-diagnosis mode, and the normal operation, of the optical disc apparatus 102 will be described with reference to FIG. 2.

Figure 2:
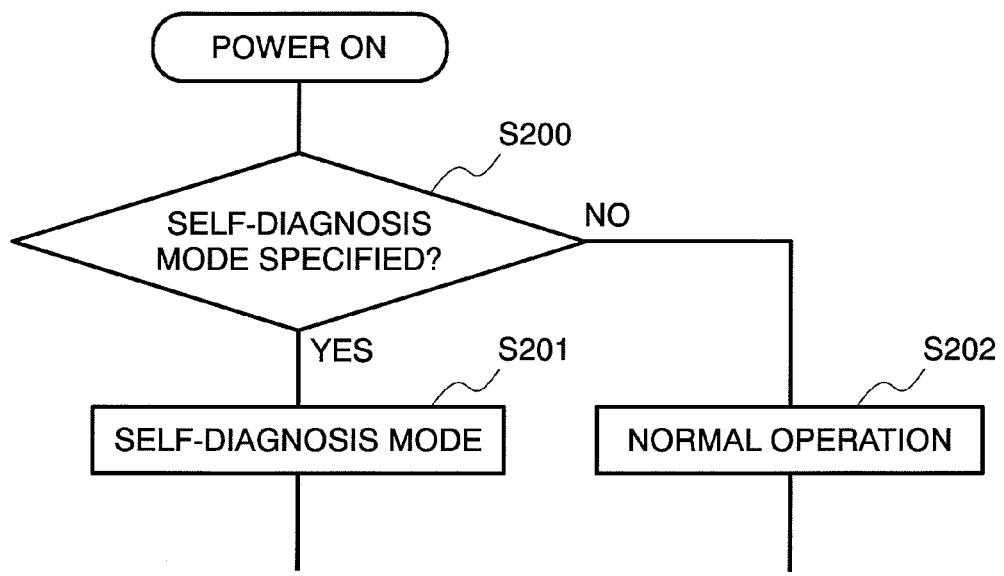
FIG. 2 is a flowchart illustrating a process of selecting between a self-diagnosis mode and a normal operation.

FIG. 2 is a flowchart illustrating the processing of selecting between the self-diagnosis mode and the normal operation.

When the power supply is turned ON, the microprocessor 104 of the optical disc apparatus 102 checks whether or not the self-diagnosis mode is specified in the ROM 110 under such settings (S200). If it is judged that the self-diagnosis mode is specified, the microprocessor 104 instructs the optical disc apparatus 102 to perform the self-diagnosis operation (S201). If it is judged that the self-diagnosis mode is not specified, the microprocessor 104 instructs the optical disc apparatus 102 to perform the normal operation (S202).

Next, a process of disabling the self-diagnosis mode of the optical disc apparatus 102 will be described with reference to FIGS. 3 and 4.

Figure 3:
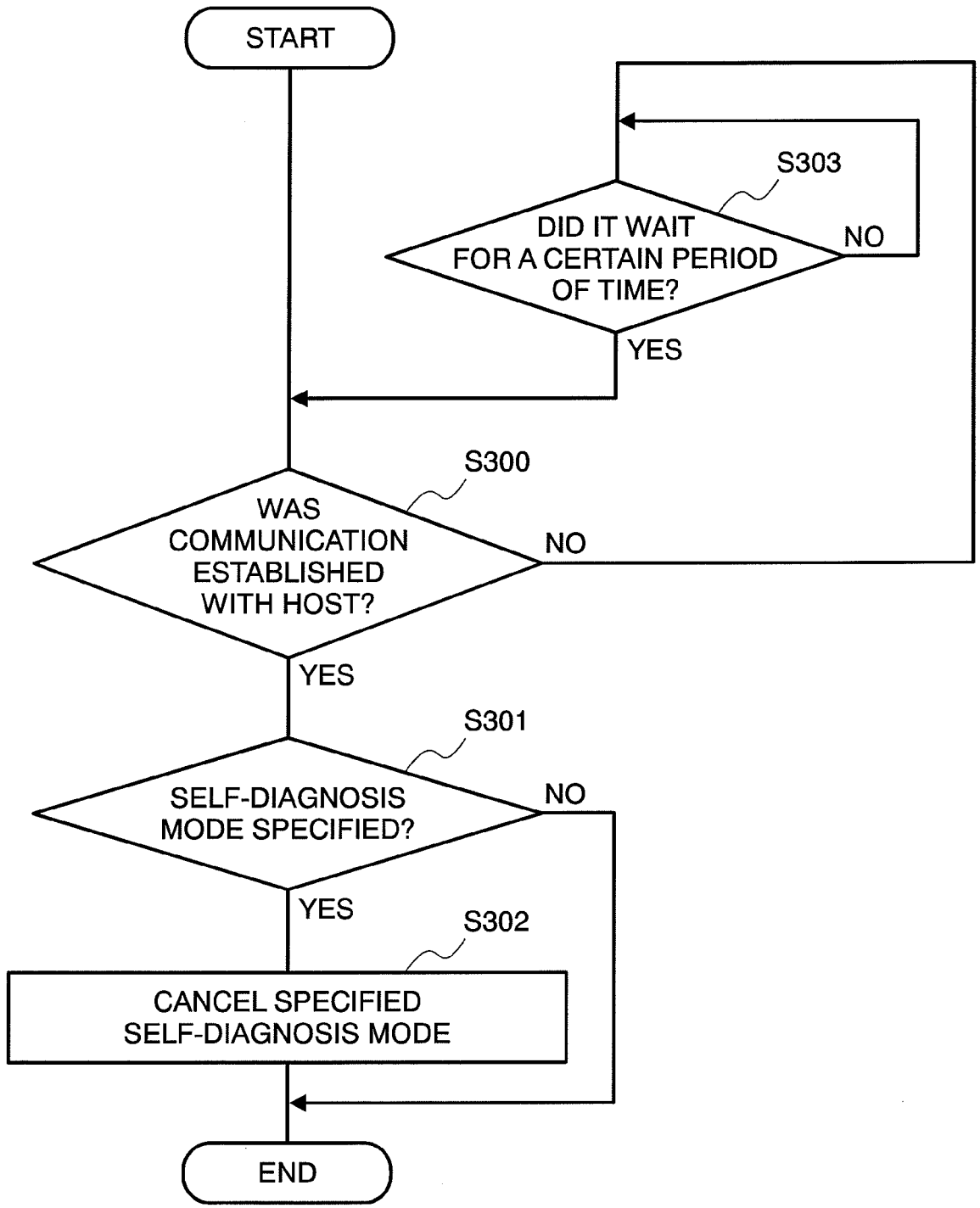
FIG. 3 is a flowchart illustrating a process of disabling the self-diagnosis mode.

FIG. 3 is a flowchart illustrating the process of disabling the self-diagnosis mode.

Figure 4:
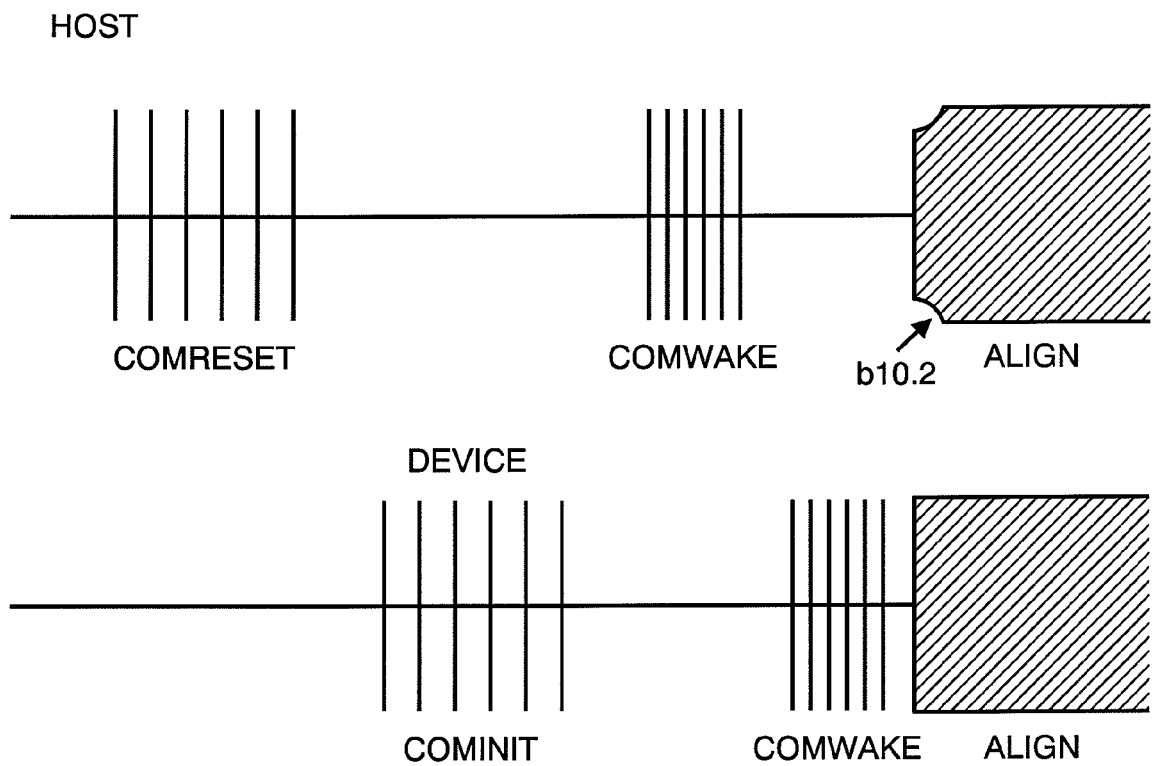
FIG. 4 is a diagram illustrating an OOB signal of an SATA interface.

FIG. 4 is a diagram illustrating an OOB signal of the SATA interface.

This disabling process of disabling the self-diagnosis mode is performed when the OOB (Out of Band) signal is transmitted/received after a connection between the host computer 101 and the optical disc apparatus 102 is made.

The OOB signal is one of the characteristics of SATA. The OOB signal is used as a mechanism for controlling reset/initialization of an interface, establishment of communications, and speed negotiation.

As shown in FIG. 4, by use of the OOB signal, communications between the host computer and the optical disc apparatus are established by COMRESET/COMWAKE, and then speed negotiation starts by align primitive.

First of all, the SATA interface 109 communicates the OOB signal with the host computer 101, and thereby the microprocessor 104 checks whether or not the communications between the host computer and the optical disc apparatus has been established (S300). Here, it is assumed that when the communications has been established by use of the OOB signal, the connection between the host computer 101 and the optical disc apparatus has been established.

If the optical disc apparatus 102 is not connected to the host computer 101, the optical disc apparatus 102 communicates the OOB signal with the host computer 101 after waiting for a fixed period of time (for example, after a lapse of 10 ms) (S303) so as to check whether or not the communications has been established.

If the optical disc apparatus 102 is connected to the host computer 101, the microprocessor 104 reads out information stored in the ROM 110 to check whether or not the self-diagnosis mode is specified (S301).

If it is judged that the self-diagnosis mode is not specified, the process ends.

If it is judged that the self-diagnosis mode is specified, the microprocessor 104 erases information about the self-diagnosis mode specification stored in the ROM 110 (S302). In addition, when the optical disc apparatus 102 operates in the self-diagnosis mode, the optical disc apparatus 102 ends the self-diagnosis mode.

If the SATA interface is used, the OOB signal is always communicated at the time of initialization. Therefore, even if an optical disc apparatus is shipped with the self-diagnosis mode specification information being kept stored in a ROM at the time of product shipment from a factory, the self-diagnosis mode specification information is erased as a result of the above-described processing. Accordingly, a malfunction does not occur at a destination site.

Incidentally, although the optical disc apparatus is taken as the example in this embodiment, the present invention can also be applied to other peripheral devices (for example, hard disk drives), each of which includes a SATA interface for communicating with a host computer, and each of which is capable of performing self diagnosis to store information about the self-diagnosis mode specification in a memory thereof.

According to the present invention, it is possible to eliminate an unnecessary command transmission/reception interface with the host PC, such as a self-diagnosis mode disabling command, in an optical disc apparatus capable of performing self-diagnosis, and thereby to reduce the labor of product development.

Moreover, according to the present invention, it is possible to automatically disable a self-diagnostic mode of an optical disc apparatus in a destination site even if the optical disc apparatus is shipped with the self-diagnostic mode being kept specified, and thereby to prevent a malfunction of the optical disc apparatus.

What is claimed is:

1. An optical disc apparatus that is connected to a host computer to receive a command to operate the optical disc apparatus in a self-diagnostic mode, and that then writes self-diagnosis mode specification information to a nonvolatile memory in response to the command so that inspection is performed in a state in which the optical disc apparatus is not connected to the host computer, wherein:

when the connection between the optical disc apparatus and the host computer has been established, the self-diagnosis mode specification information is erased.

2. The optical disc apparatus according to claim 1, wherein the optical disc apparatus is connected to the host computer through an SATA interface.

3. The optical disc apparatus according to claim 2, wherein the connection between the optical disc apparatus and the host computer is established by an out-of-band signal of the SATA interface.

4. The optical disc apparatus according to claim 1, wherein the memory is a writable ROM.

5. A method for self-diagnosis control of an optical disc apparatus, the optical disc apparatus being connected to a host computer so that a command is transmitted, the optical disc apparatus performing inspection in a state in which the optical disc apparatus is not connected to the host computer, the method comprising the steps of:

receiving, from the host computer, a command to operate the optical disc apparatus in a self-diagnostic mode;

writing self-diagnosis mode specification information to a nonvolatile memory in response to the command by use of a control unit;

disabling the connection between the optical disc apparatus and the host computer; and erasing, when the connection between the optical disc apparatus and the host computer has been established, the self-diagnosis mode specification information by use of the control unit.

6. The method for self-diagnosis control of the optical disc apparatus according to claim 5, wherein the optical disc apparatus is connected to the host computer through an SATA interface.

7. The method for self-diagnosis control of the optical disc apparatus according to claim 6, wherein the connection between the optical disc apparatus and the host computer is established by an out-of-band signal of the SATA interface.

8. The method for self-diagnosis control of the optical disc apparatus according to claim 5, wherein the memory is a writable ROM.

* * * * *